US009418358B2

(12) United States Patent
Johnson et al.

(10) Patent No.: US 9,418,358 B2
(45) Date of Patent: Aug. 16, 2016

(54) PRE-CONFIGURE AND CUSTOMIZE ATM INTERACTION USING MOBILE DEVICE

(71) Applicant: BANK OF AMERICA CORPORATION, Charlotte, NC (US)

(72) Inventors: Tyler Johnson, Tega Cay, SC (US); Christian Michael Mande, Charlotte, NC (US); James Robert Grimsley, Dover, FL (US); Sara Gill, New York, NY (US); Nathan Dent, Concord, NC (US); Kristy M. Crist, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/562,471

(22) Filed: Dec. 5, 2014

(65) Prior Publication Data
US 2016/0162855 A1 Jun. 9, 2016

(51) Int. Cl.
| *G06Q 40/00* | (2012.01) |
| *G07D 11/00* | (2006.01) |
| *G07F 19/00* | (2006.01) |
| *G06Q 20/10* | (2012.01) |
| *G06Q 20/32* | (2012.01) |
| *G06Q 20/36* | (2012.01) |
| *G06Q 20/38* | (2012.01) |
| *G06Q 20/40* | (2012.01) |

(52) U.S. Cl.
CPC .......... *G06Q 20/1085* (2013.01); *G06Q 20/327* (2013.01); *G06Q 20/363* (2013.01); *G06Q 20/381* (2013.01); *G06Q 20/3821* (2013.01); *G06Q 20/405* (2013.01)

(58) Field of Classification Search
CPC ........ G06Q 40/00; G07D 11/00; G07F 19/00; G06K 5/00; G06K 19/02
USPC ........ 235/379, 380, 382, 487; 705/41, 39, 44, 705/43, 42
See application file for complete search history.

(56) References Cited

U.S. PATENT DOCUMENTS

| 6,296,079 | B1 * | 10/2001 | McNaughton ......... G06Q 20/18 109/45 |
| 7,177,838 | B1 | 2/2007 | Ling |
| 7,328,189 | B2 | 2/2008 | Ling |
| 7,606,560 | B2 | 10/2009 | Labrou et al. |
| 7,784,684 | B2 | 8/2010 | Labrou et al. |
| 7,848,980 | B2 | 12/2010 | Carlson |
| 7,992,779 | B2 | 8/2011 | Phillips et al. |
| 8,380,177 | B2 | 2/2013 | Laracey |
| 8,584,251 | B2 | 11/2013 | McGuire et al. |
| 9,019,370 | B2 * | 4/2015 | Shirbabadi ............ G07F 19/201 348/142 |
| 2009/0164327 | A1 | 6/2009 | Bishop et al. |

(Continued)

*Primary Examiner* — Edwyn Labaze
(74) *Attorney, Agent, or Firm* — Michael A. Springs; Moore & Van Allen PLLC; Patrick B. Horne

(57) ABSTRACT

Embodiments of the invention are directed to a system, method, or computer program product for communicating customer preferences to an automated teller machine (ATM). In this way, the system receives at least one customer preference for conducting transactions at an ATM and input from the customer indicating the customer's desire to conduct an ATM transaction. In response to receiving the customer input, the system may generate a customer preference communication for receipt by the ATM, wherein the customer preference communication comprises at least of the at least one customer preferences for conducting transactions at an ATM.

20 Claims, 13 Drawing Sheets

(56) References Cited

U.S. PATENT DOCUMENTS

| | | |
|---|---|---|
| 2010/0161720 A1* | 6/2010 | Colligan ............... G06Q 30/02 709/203 |
| 2010/0241571 A1 | 9/2010 | McDonald |
| 2012/0203700 A1 | 8/2012 | Ornce et al. |
| 2013/0018738 A1* | 1/2013 | Faires et al. ..................... 705/16 |
| 2013/0036048 A1* | 2/2013 | Campos et al. ................. 705/41 |
| 2013/0110658 A1 | 5/2013 | Lyman et al. |
| 2013/0124855 A1* | 5/2013 | Varadarajan et al. ......... 713/155 |
| 2013/0159178 A1 | 6/2013 | Colon et al. |
| 2013/0246258 A1 | 9/2013 | Dessert |
| 2013/0254115 A1 | 9/2013 | Pasa et al. |
| 2013/0262315 A1 | 10/2013 | Hruska |
| 2014/0006451 A1* | 1/2014 | Mullis .................... G06Q 20/18 707/784 |
| 2014/0058834 A1* | 2/2014 | Liberty et al. ............. 705/14.49 |
| 2014/0081858 A1* | 3/2014 | Block .................. G07F 19/207 705/43 |
| 2014/0263618 A1* | 9/2014 | McCarthy et al. ............ 235/379 |
| 2015/0058216 A1* | 2/2015 | Luciani ........................... 705/43 |

\* cited by examiner

| ATM DISPLAY 602 | | |
|---|---|---|
| TYPICAL DISPLAY LOCATION 702 | DISPLAY LOCATION 1 704 | DISPLAY LOCATION 2 706 |
| DISPLAY LOCATION 3 708 | DISPLAY LOCATION 4 710 | DISPLAY LOCATION 5 712 |
| DISPLAY LOCATION 6 714 | DISPLAY LOCATION 7 716 | DISPLAY LOCATION 8 718 |
| DISPLAY LOCATION 9 720 | DISPLAY LOCATION 10 722 | DISPLAY LOCATION 11 724 |

PRE-CONFIGURE AND CUSTOMIZE ATM INTERACTION USING MOBILE DEVICE

BACKGROUND

The advent of the Automated Teller Machine (ATM) has provided customers with convenient access to perform banking operations report of the financial institutions. This includes deposits, cash withdraws, and other transactions, such as receiving stamps, or the like. Typically, ATM machines are located on busy street corners, drive-up windows and in other public locations.

As such, a customer may input a personal identification number (PIN) and finish a banking operation while in public. Thus, there may be potential privacy concerns with respect to performing bank operations while in a public area.

BRIEF SUMMARY

Embodiments of the present invention address the above needs and/or achieve other advantages by providing apparatuses (e.g., a system, computer program product and/or other devices) and methods for communicating customer preferences to an Automated Teller Machine (ATM).

In some embodiments, a mobile device for communicating customer preferences to an ATM is provided. The mobile device comprises: a computer apparatus including a processor and a memory; and a digital wallet module stored in the memory, comprising executable instructions that when executed by the processor cause the processor to: receive at least one customer preference for conducting transactions at an ATM; receive input from the customer indicating the customer's desire to conduct an ATM transaction; and in response to receiving the customer input, generate a customer preference communication for receipt by the ATM, wherein the customer preference communication comprises at least of the at least one customer preferences for conducting transactions at an ATM.

In some embodiments, generating the customer preference communication comprises generating a readable indicia comprising information corresponding to at least one of the at least one customer preferences.

In some embodiments, the readable indicia comprises a QR code.

In some embodiments, generating a customer preference communication comprises generating a wireless communication for transmission to the ATM.

In some embodiments the customer preference communication comprises an NFC communication.

In some embodiments, the at least one customer preference comprises a preferred language for conducting ATM transactions.

In some embodiments, the executable instructions that when executed by the processor further cause the processor to: determine that the mobile device has entered a jurisdiction foreign to the customer's home jurisdiction; in response to determining that the mobile device has entered the foreign jurisdiction, prompt the customer regarding whether the customer desires ATM transactions to be conducted in a preferred language of the customer; and in response to receiving customer input indicating a desire to conduct ATM transactions in the preferred language of the customer, generating the customer preference communication comprising at least one customer preference comprising information corresponding to the preferred language of the customer.

In some embodiments, the executable instructions that when executed by the processor further cause the processor to: prompt the customer to input whether the customer desires to pre-stage the ATM transaction; receive customer input indicating the customer's desire to pre-stage the ATM transaction; receive transaction details from the customer; and wherein generating the customer preference communication comprises generating a readable indicia comprising information corresponding to the received transaction details.

In some embodiments, the executable instructions that when executed by the processor further cause the processor to: communicate a one-use personal identification number (PIN) to the customer, wherein the one-use PIN corresponds to a preferred language of the customer; wherein when the customer enters the one-use PIN into the ATM, the ATM transaction is conducted in the preferred language of the customer.

In some embodiments, the executable instructions that when executed by the processor further cause the processor to: receive the one-use PIN from a backend system of a financial institution managing the ATM.

In some embodiments, the executable instructions that when executed by the processor further cause the processor to: determine that the mobile device has entered a jurisdiction foreign to the customer's home jurisdiction; and generate an alert communicating to the customer availability of a dynamic currency exchange.

In some embodiments, the executable instructions that when executed by the processor further cause the processor to: generate an alert communicating to the customer location information corresponding to at least one ATM near a location of the mobile device.

In some embodiments, a computer program product for communicating customer preferences to an automated teller machine (ATM) is provided. The computer program product comprises a non-transitory computer-readable medium comprising code causing a first apparatus to: receive at least one customer preference for conducting transactions at an ATM; receive input from the customer indicating the customer's desire to conduct an ATM transaction; and in response to receiving the customer input, generate a customer preference communication for receipt by the ATM, wherein the customer preference communication comprises at least of the at least one customer preferences for conducting transactions at an ATM.

In some embodiments, a computer-implemented method for generating a virtual check on a mobile device is provided. The method comprises: receiving at least one customer preference for conducting transactions at an ATM; receiving input from the customer indicating the customer's desire to conduct an ATM transaction; and in response to receiving the customer input, generating a customer preference communication for receipt by the ATM, wherein the customer preference communication comprises at least of the at least one customer preferences for conducting transactions at an ATM.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
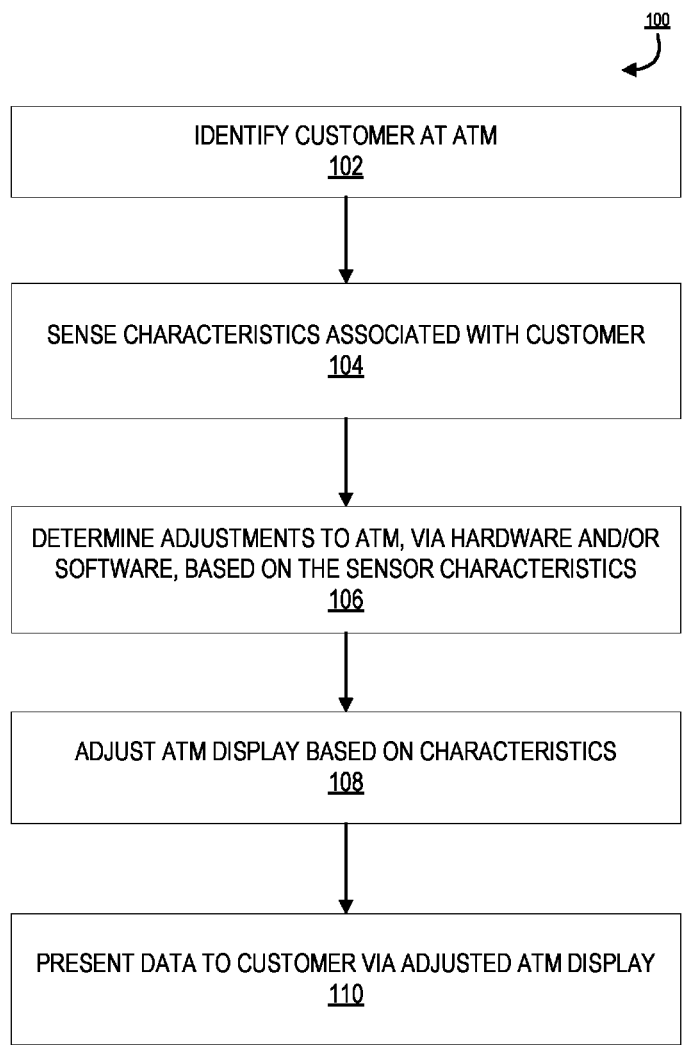
Figure 2:
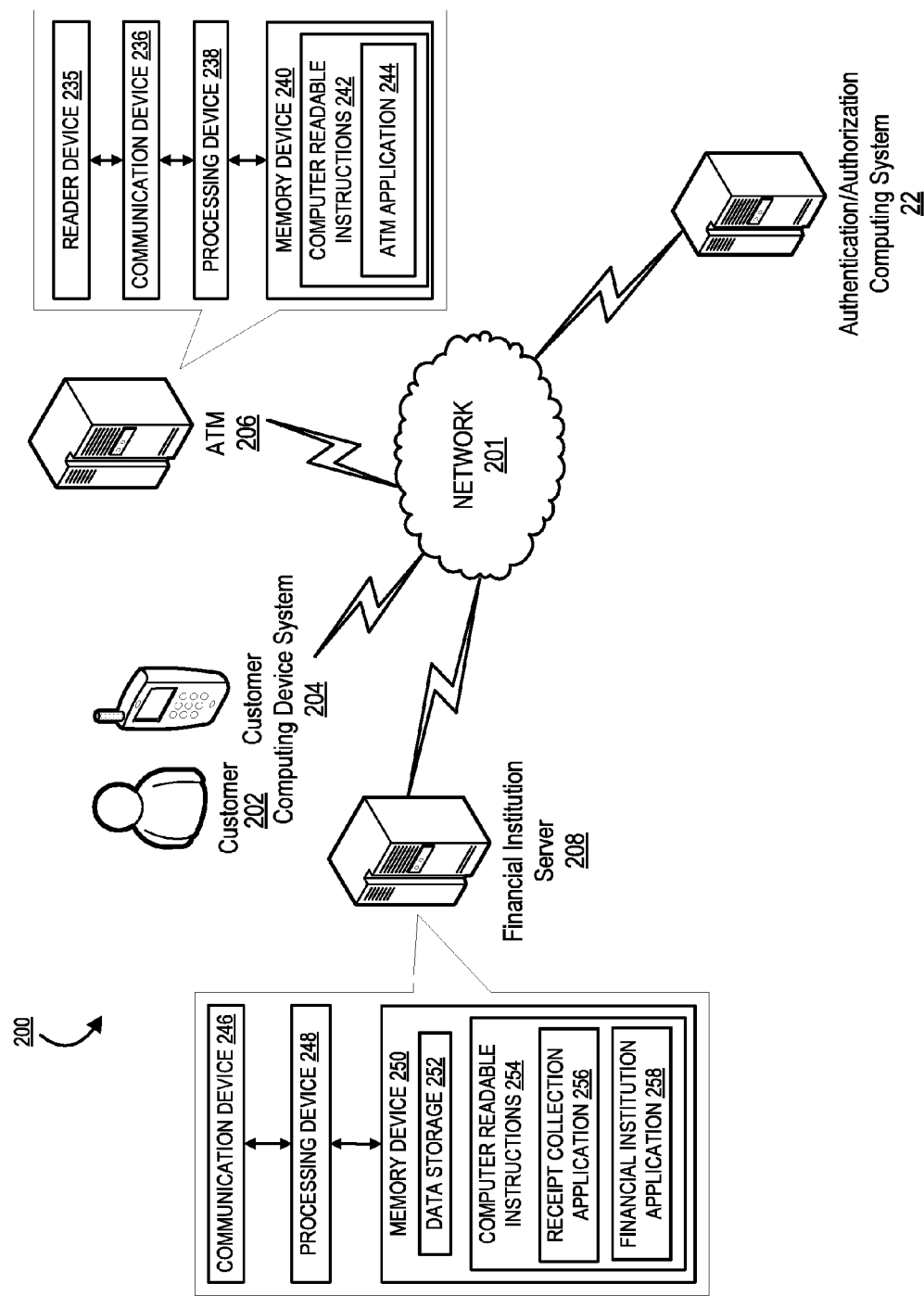
Figure 3:
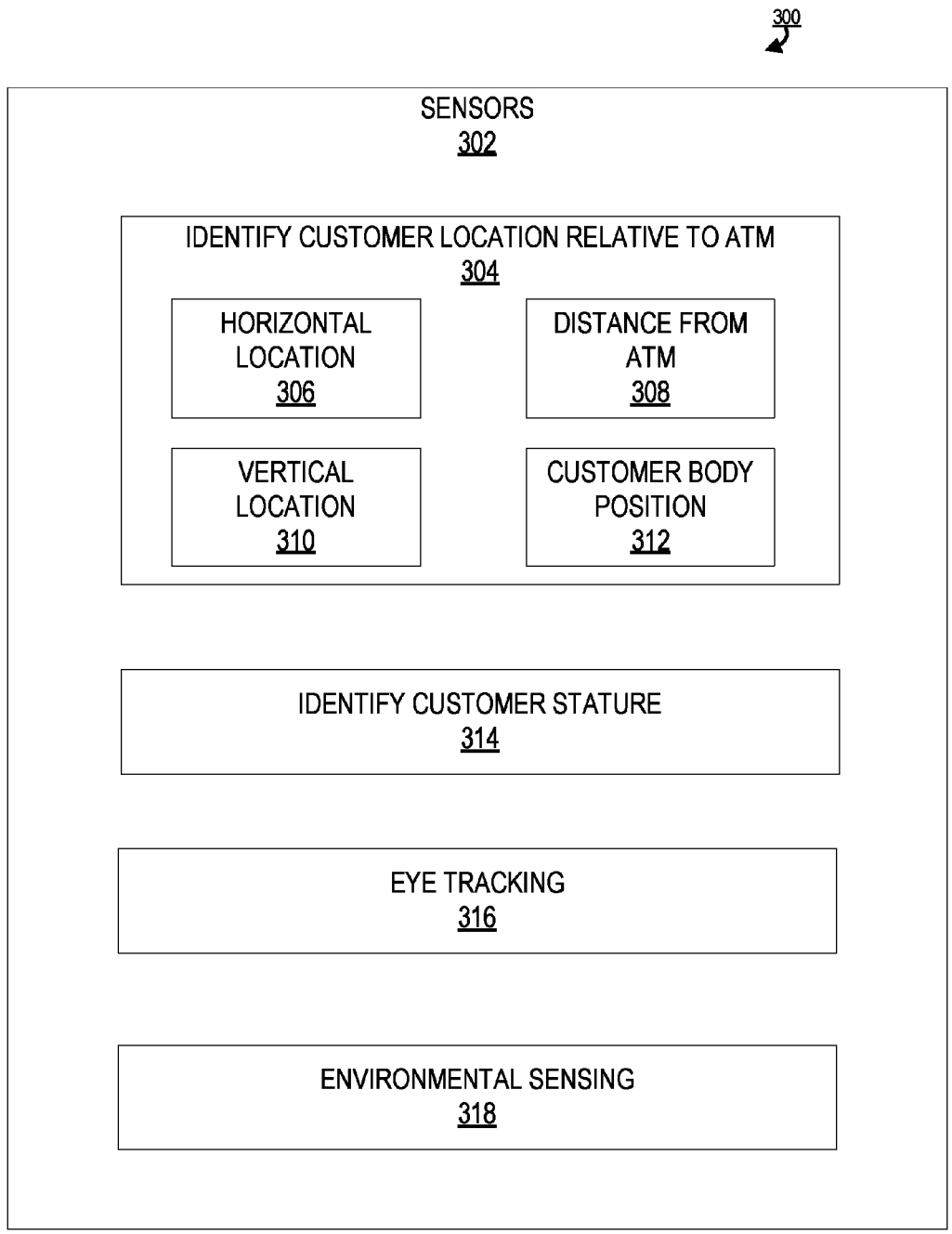
Figure 4:
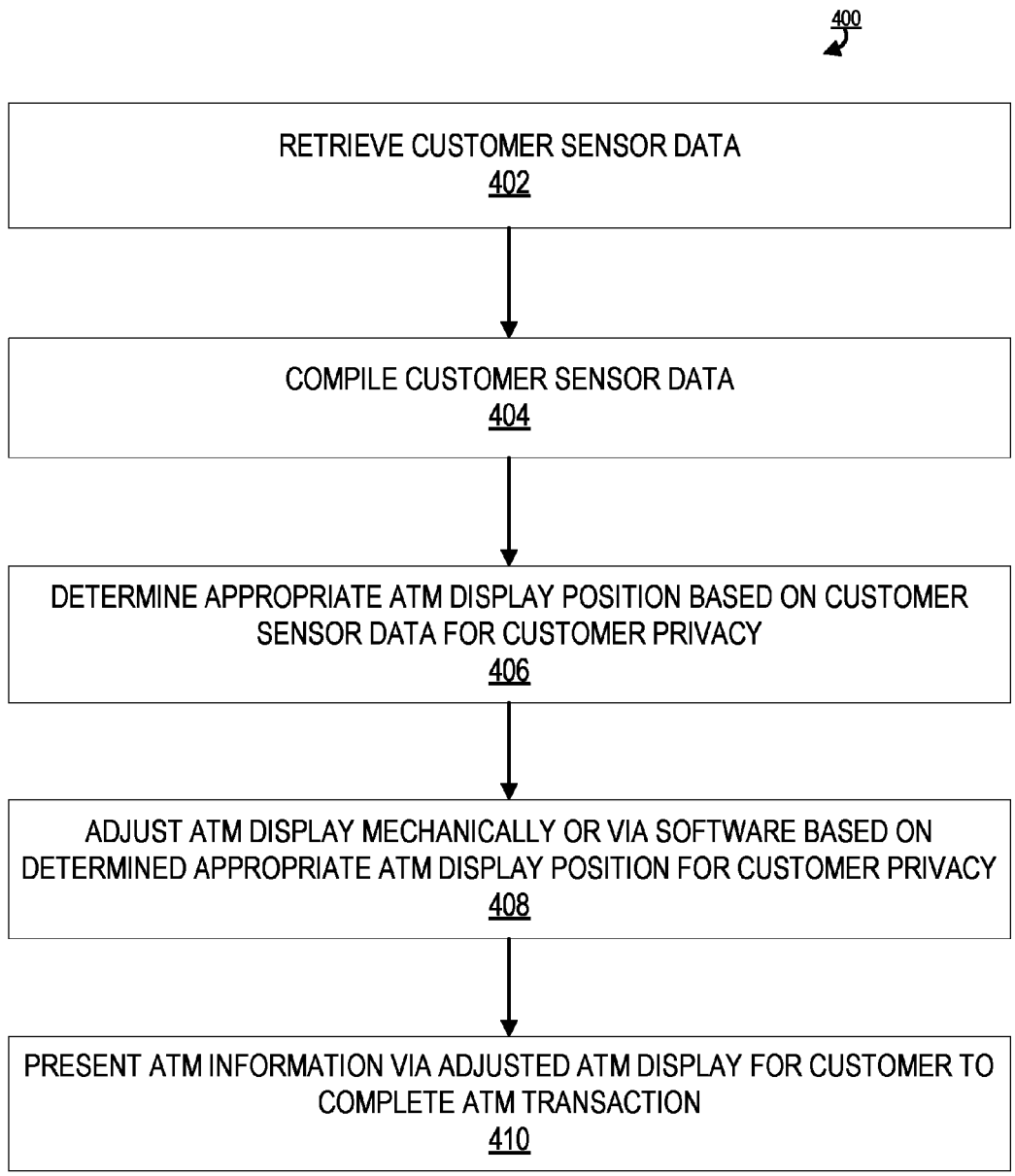
Figure 5:
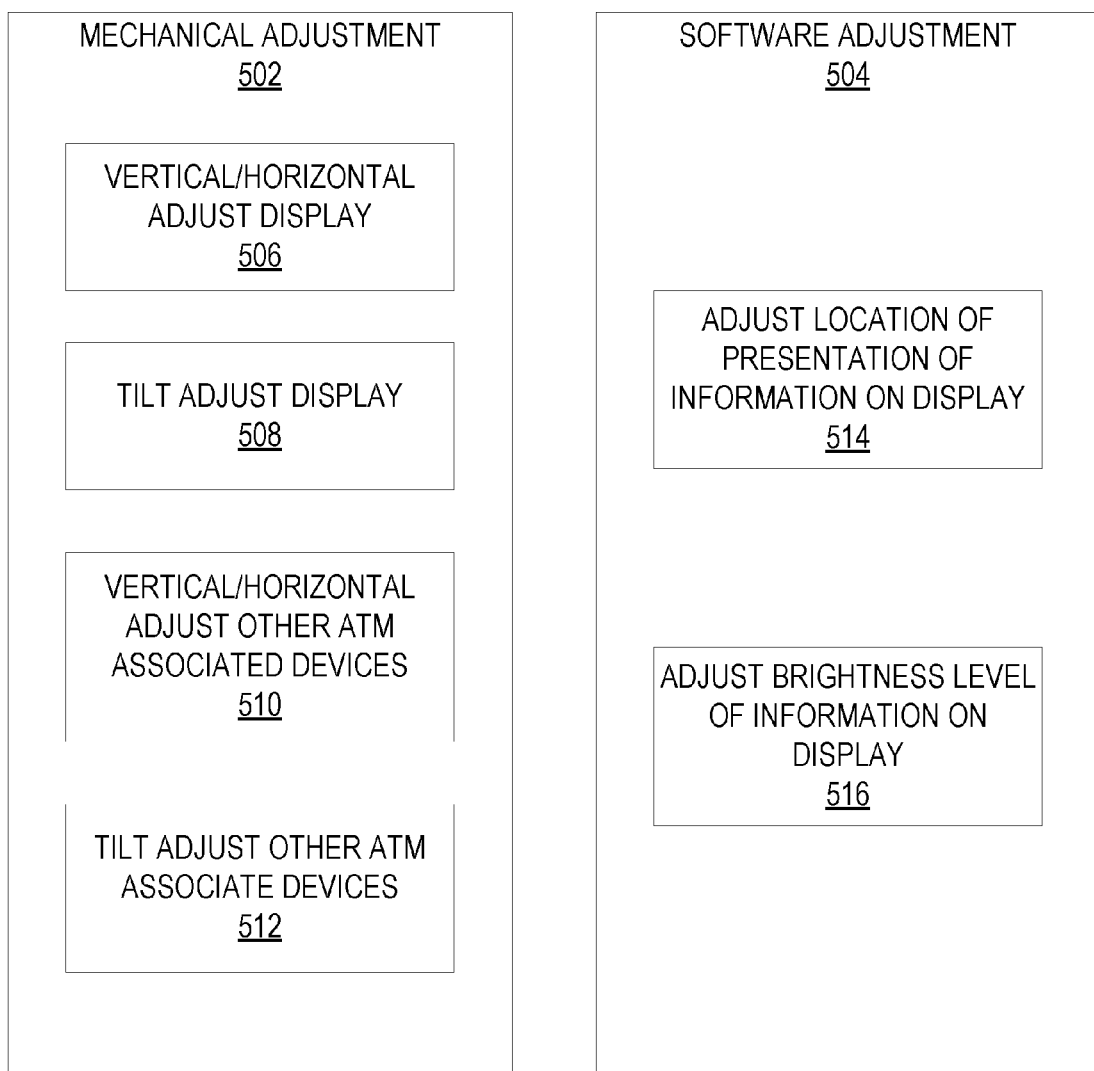
Figure 6:
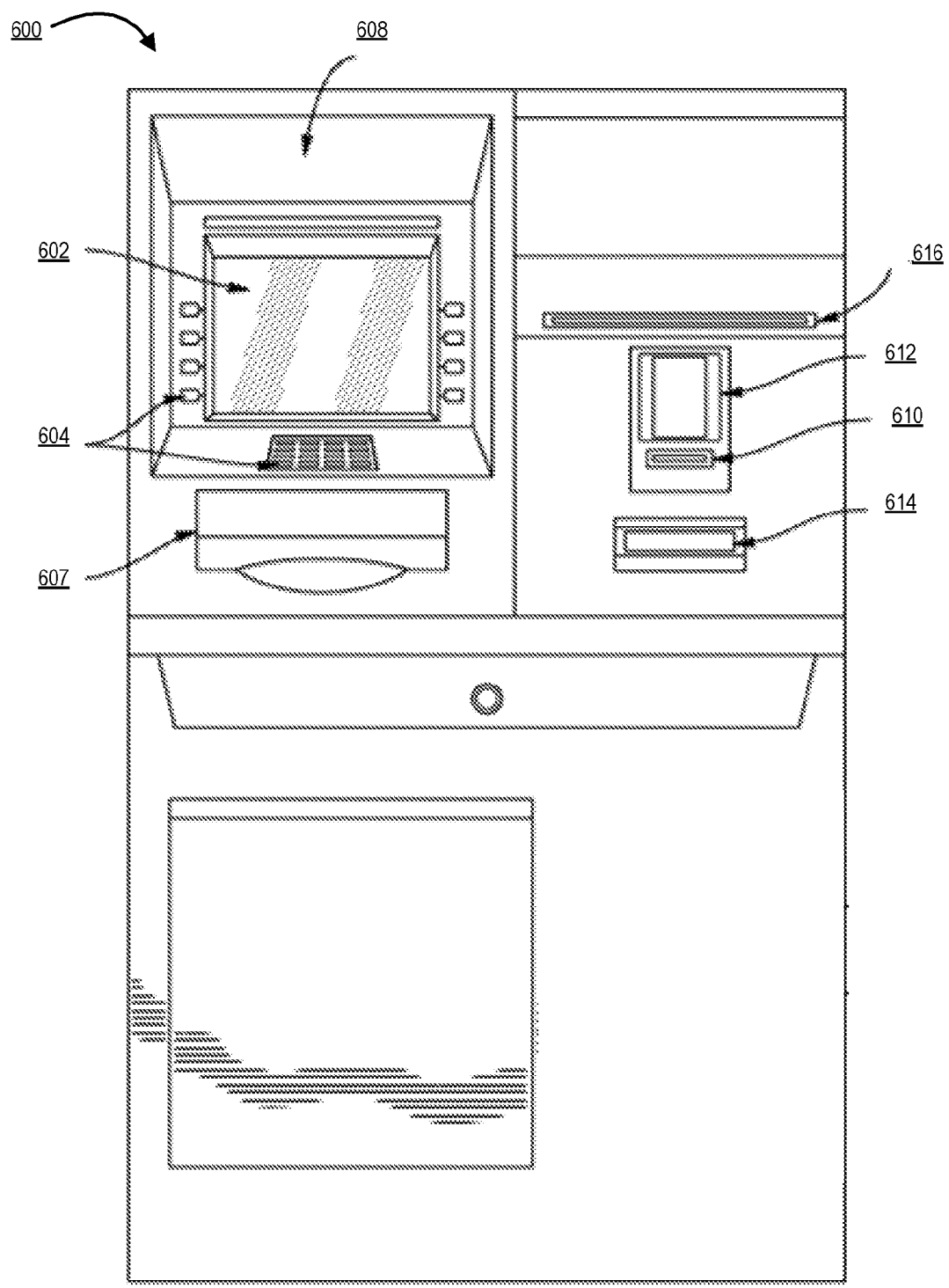
Figure 7:
Figure 8:
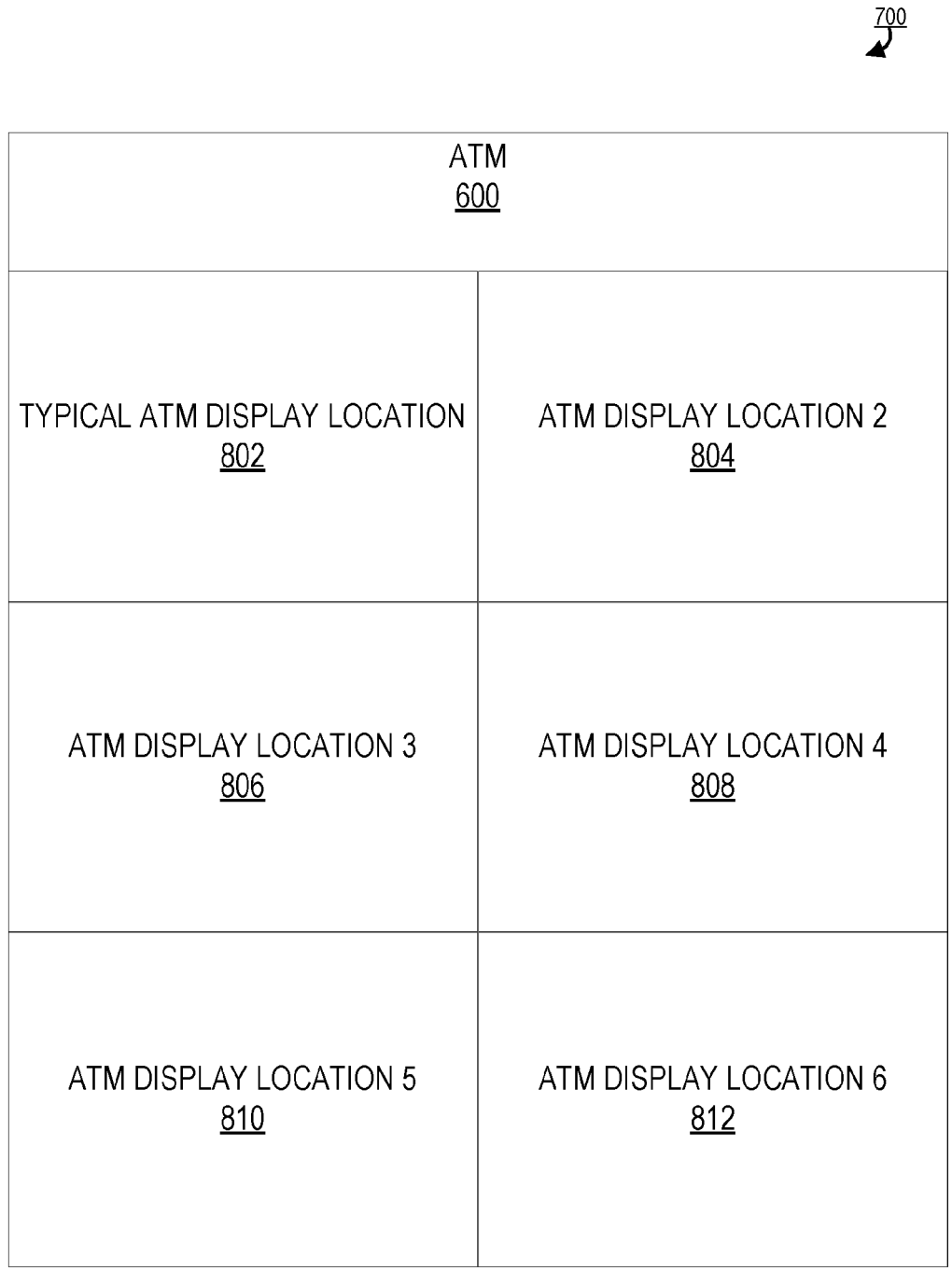
Figure 9:
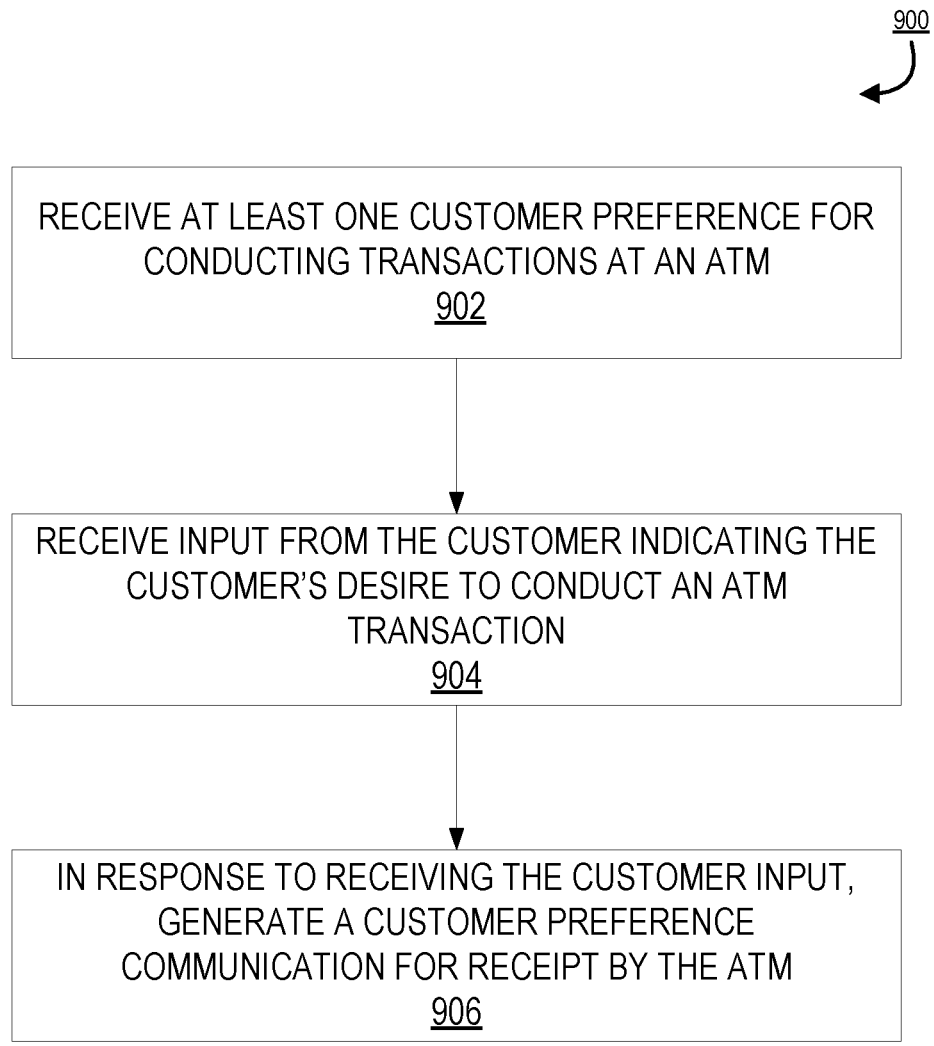
Figure 10:
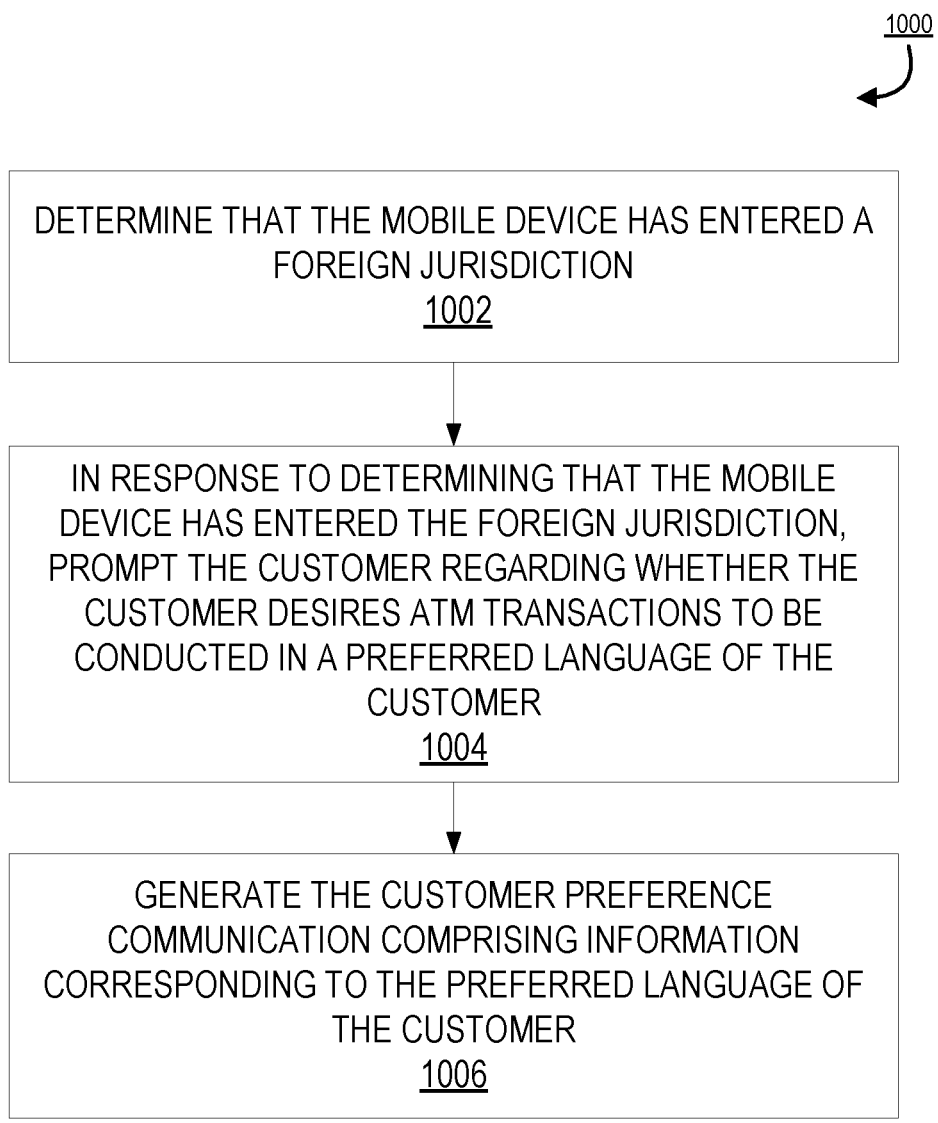
Figure 11:
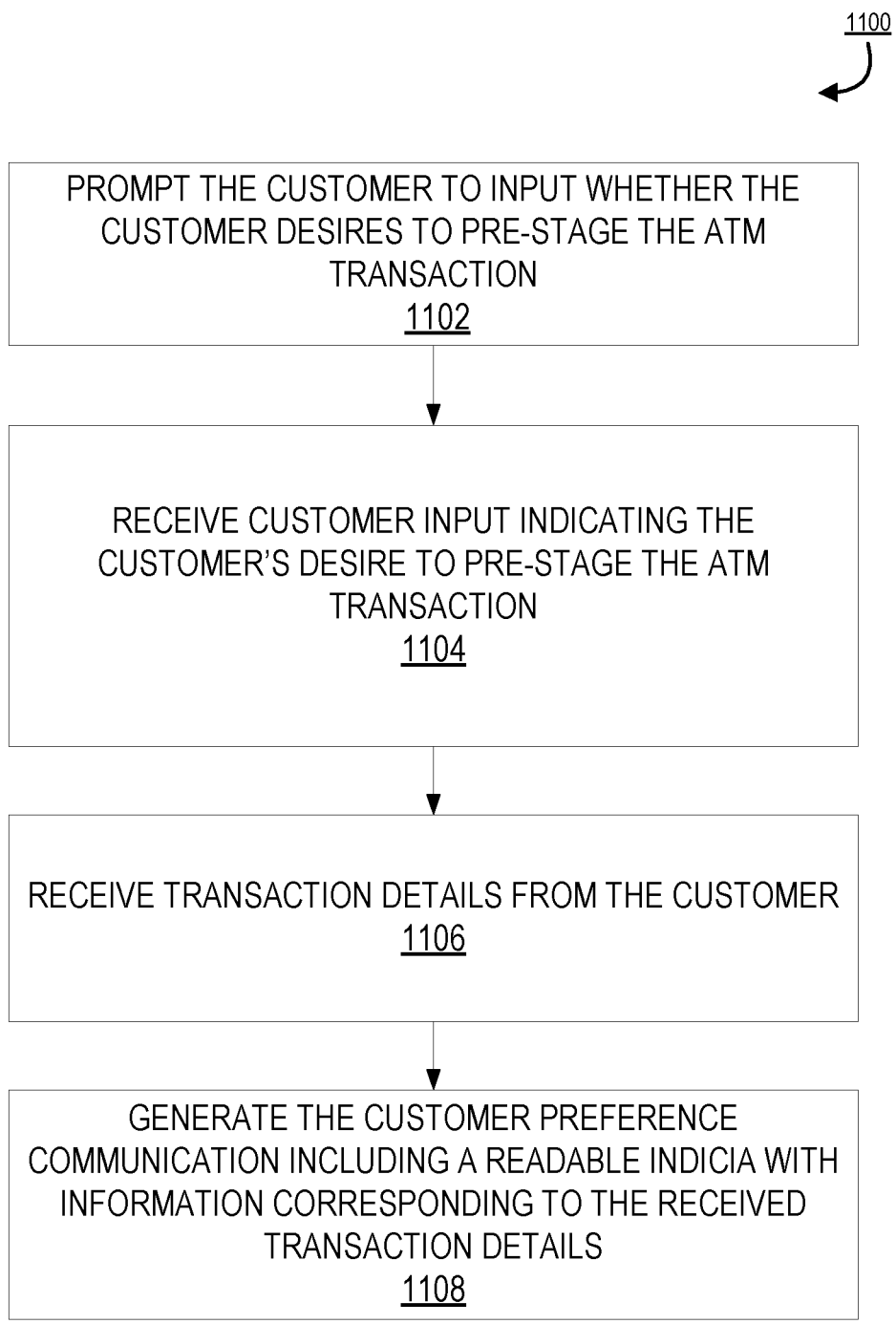
Figure 12:
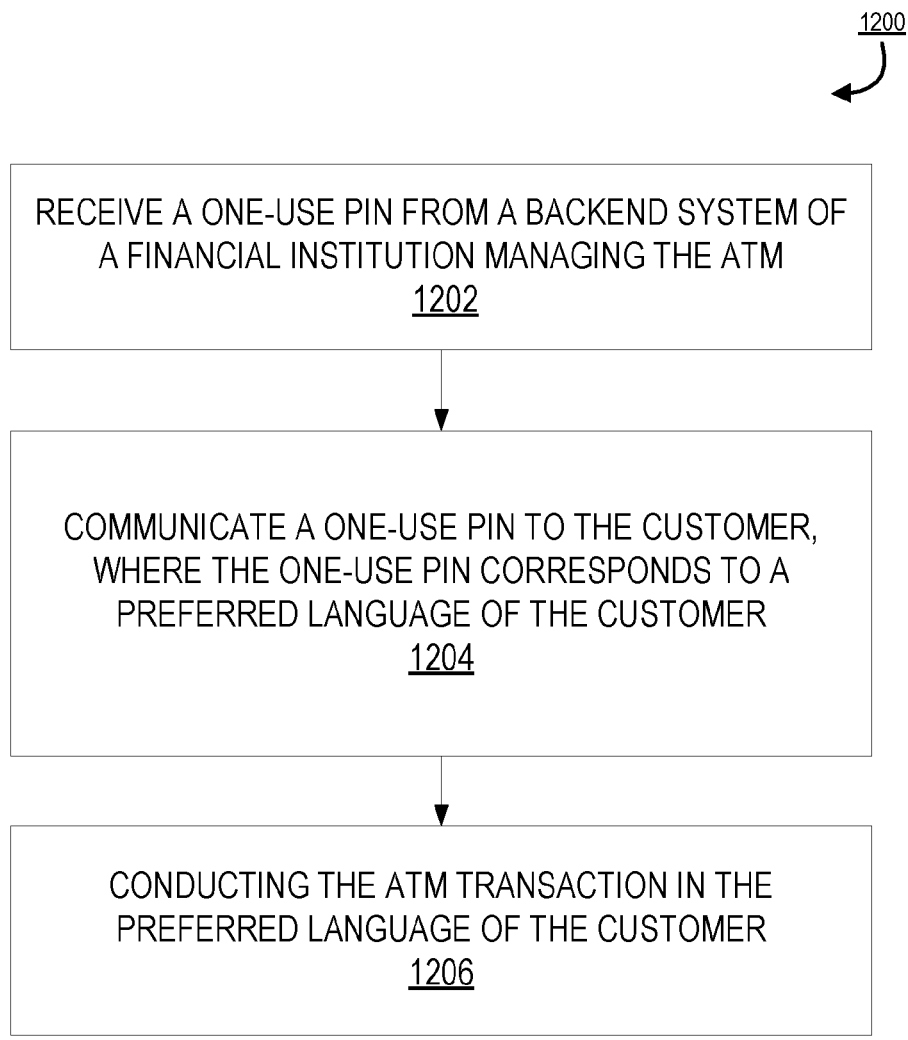
Figure 13:
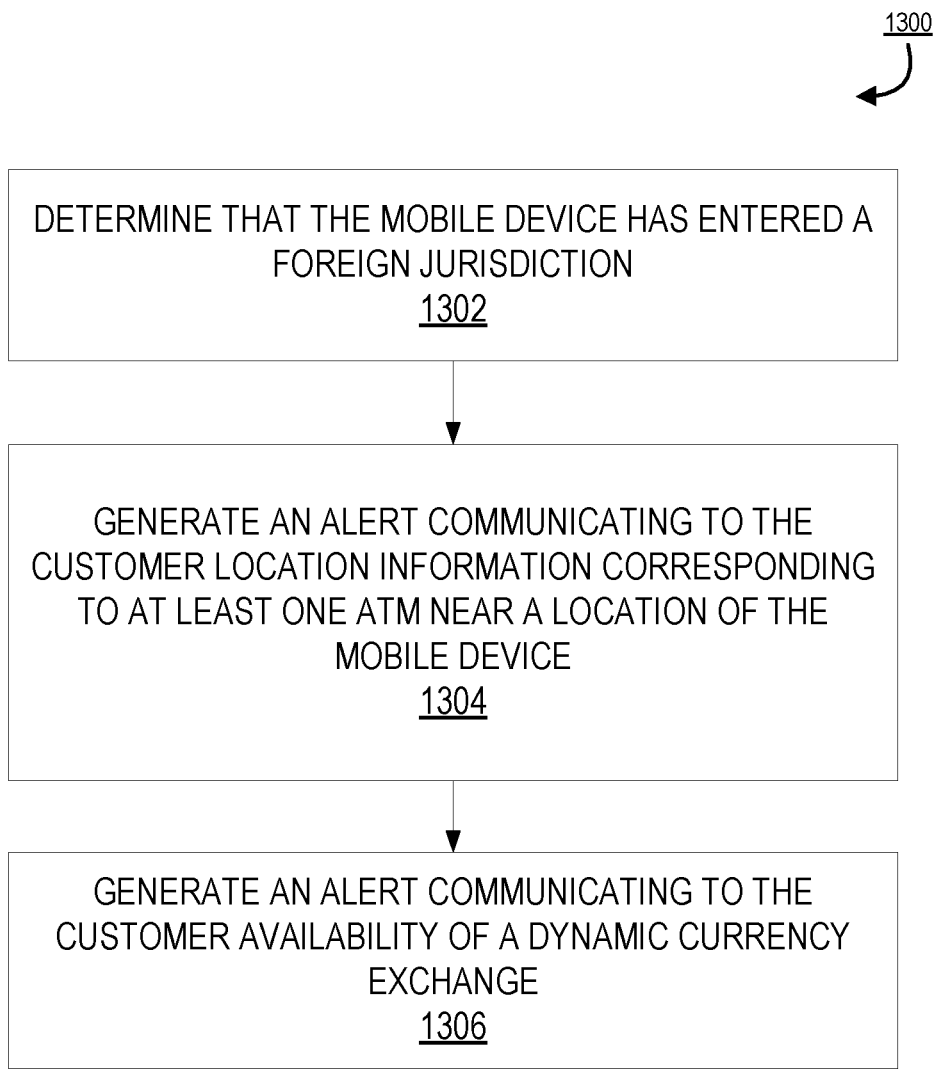

Having thus described embodiments of the invention in general terms, reference will now be made to the accompanying drawings, wherein:

FIG. 1 provides a high level process flow illustrating the position adaptive ATM application process, in accordance with one embodiment of the present invention;

FIG. 2 provides a position adaptive ATM system environment, in accordance with one embodiment of the present invention;

FIG. 3 provides a process map illustrating sensing of customer positioning, in accordance with one embodiment of the present invention;

FIG. 4 provides a process map illustrating determining a positioning of ATM data for an ATM transaction, in accordance with one embodiment of the present invention;

FIG. 5 provides a process map illustrating mechanical and software adjustment of the ATM display and ATM information presented on the display, in accordance with one embodiment of the present invention;

FIG. 6 provides a representative illustration of a ATM, in accordance with one embodiment of the present invention;

FIG. 7 provides a process map illustrating software adjustment of the ATM information on the ATM display, in accordance with one embodiment of the present invention;

FIG. 8 provides a process map illustrating mechanical adjustment of ATM display on the ATM, in accordance with one embodiment of the present invention;

FIG. 9 provides a process map for configuring an ATM according to embodiments of the invention;

FIG. 10 provides a process map for configuring an ATM based on a preferred language according to embodiments of the invention;

FIG. 11 provides a process map for pre-staging an ATM transaction according to embodiments of the invention;

FIG. 12 provides a process map for configuring an ATM according to embodiments of the invention; and FIG. 13 provides a process map for utilizing a dynamic currency exchange according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer Automated Teller Machines (ATM).

Some portions of this disclosure are written in terms of a financial institution's unique position with respect to customer transactions. As such, a financial institution may be able to utilize its unique position to create and update ATM transactions with a customer.

The embodiments described herein may refer to the initiation of a transaction, transaction event initiated, or ATM event at to trigger the steps, functions, routines, or the like described herein. In various embodiments, occurrence of a transaction triggers the sending of information such as authentication information or the like via an ATM to initiate an ATM transaction. Unless specifically limited by the context, a "transaction", "transaction event" or "point of transaction event" refers to any customer interaction with an ATM. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a customer interaction with an ATM, such as an account balance inquiry, a payment, a purchase, a withdraw, a rewards transfer, an account money transfer, an opening of a bank account, and/or the like.

In some embodiments, an ATM is or includes an interactive computer terminal that is configured to initiate, perform, complete, and/or facilitate one or more transactions. An ATM could be or include any device that a customer may use to perform a transaction with an entity.

In some embodiments, an ATM is operated in a public place (e.g., on a street corner, at the doorstep of a private residence, in an open market, at a public rest stop, or the like). In other embodiments, the ATM is additionally or alternatively operated in a place of business (e.g., in a retail store, post office, banking center, grocery store, factory floor, or the like). In accordance with some embodiments, the ATM is owned by the financial institution providing the ATM. In other embodiments, the ATM is owned by one or more third party merchants. In yet other embodiments, the ATM is owned by other financial institutions. While multiple ATM machines are mentioned throughout this discloser, one of ordinary skill in the art will appreciate that one ATM may include all of the features disclosed herein.

FIG. 1 provides a high level process flow illustrating position adaptive ATM application process 100, in accordance with one embodiment of the present invention. First, as illustrated in block 102, the system may identify a customer approaching or at an ATM. In some embodiments, a sensor from the system may identify a customer approaching the ATM. In other embodiments, the system may identify that a customer is at an ATM by the customer initiating a transaction with the ATM, such as initially inserting his/her debit or ATM card into the ATM.

Next, as illustrated in block 104, the process 100 continues by sensing characteristics associated with the customer. In some embodiments, the characteristics may be customer specific, such as a distance from the ATM the customer is standing, the customer's stature, eye location, eye movement, horizontal positioning relative to the ATM, and/or the like. In other embodiments, the characteristics may be environmental, such as the time of day, shadowing, temperature, precipitation conditions, or the like. In some embodiments, the characteristics are sensed by one or more sensors associated with the ATM.

Once characteristics have been identified, the system may determine adjustments to the ATM, via hardware and/or software means, based on the customer sensor data, as illustrated in block 106. In this way, the system may determine an appropriate adjustment to the ATM display in order to provide the customer with privacy during his/her ATM transaction.

Next, the system may adjust the ATM display based on the characteristics and adjustments determined therefrom, as illustrated in block 108. The adjustments may be hardware and/or software based. Hardware adjustments may include a physical moving of the display screen of the ATM which presents ATM transaction data to the customer. In other embodiments, other devices associated with the ATM may be mechanically adjusted to provide further privacy, these may include adjustments to the number pad, deposit entry ports, withdraw exit ports, PIN pads, debit/ATM card acceptors, and/or the like. Software adjustments may include moving the ATM transaction data presented to the customer to one or more different sections of the ATM display. In this way, the presented data may not take up the entire display screen, but instead be positioned in one of several different sections of the ATM display. Furthermore, software adjustments may also include presenting information on the ATM display with varying brightness levels.

Finally, once the ATM display and information on the display has been adjusted accordingly in block 108, such that the customer's privacy is fully considered, the system presents ATM transaction data to the customer via the adjusted ATM display, such that the customer may complete his/her ATM transaction, as illustrated in block 110.

FIG. 2 illustrates a position adaptive ATM system environment 200, in accordance with one embodiment of the present invention. As illustrated in FIG. 2, the financial institution server 208 is operatively coupled, via a network 201 to the customer system 204, and to the ATM 206. In this way, the financial institution server 208 can send information to and receive information from the customer system 204 and the ATM 206 to provide a position adaptive ATM display for customer privacy. FIG. 2 illustrates only one example of an embodiment of a position adaptive ATM system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the customer 202 is an individual interacting with an ATM 206 or financial institution. As such, the interaction may be made at or through an ATM 206 associated with the financial institution.

In some embodiments, the interaction may be made by the customer 202 using a customer system 204 in connection with the ATM 206 and/or the ATM 206 itself. In some embodiments, the customer 202 may be a merchant or a person, employee, agent, associate, independent contractor, and the like that has an account or business with a financial institution or another financial institution that may provide authorization for completing a transaction using the ATM 206.

FIG. 2 also illustrates a customer system 204. The customer system 204 generally comprises a communication device 212, a processing device 214, and a memory device 216. The customer system 204 is a computing system that allows a customer 202 to interact with the financial institution to set up accounts for an ATM transaction or interact with an ATM to complete an ATM transaction. The processing device 214 is operatively coupled to the communication device 212 and the memory device 216. The processing device 214 uses the communication device 212 to communicate with the network 201 and other devices on the network 201, such as, but not limited to the ATM 206 and the financial institution server 208. As such, the communication device 212 generally comprises a modem, server, or other device for communicating with other devices on the network 201.

The customer system 204 comprises computer-readable instructions 220 and data storage 218 stored in the memory device 216, which in one embodiment includes the computer-readable instructions 220 of a customer application 222. In this way, a customer 202 open a financial institution account, remotely communicate with an ATM to complete an ATM transaction, or authorize an ATM transaction using the customer's customer system 204. The customer system 204 may be, for example, a desktop personal computer, a mobile system, such as a cellular phone, smart phone, personal data assistant (PDA), laptop, or the like. Although only a single customer system 204 is depicted in FIG. 2, the position adaptive ATM system environment 200 may contain numerous customer systems 204.

As further illustrated in FIG. 2, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the ATM 206 and the customer system 204. As such, the communication device 246 generally comprises a modem, server, or other device for communicating with other devices on the network 201.

As further illustrated in FIG. 2, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the position adaptive ATM, but not limited to data created and/or used by the financial institution application 258.

In the embodiment illustrated in FIG. 2 and described throughout much of this specification, the financial institution application 258 authorizes an ATM transaction using the ATM 206, receives sensor data, determines an appropriate adjustment to the ATM display and/or the information associated with the display, and communicates the adjustment to the ATM 206.

In some embodiments, the financial institution application 258 may authorize an ATM transaction between a customer 202 and a financial institution. In this way, the customer 202 may provide an authentication to the ATM 206 via his/her customer system 204, by swiping a ATM or debit card, providing a PIN number, contactless communication, or the like. The financial institution application 258 may identify the customer 202 based on the authentication and allow the customer 202 to proceed and complete an ATM transaction.

In some embodiments, the financial institution application 258 may receive sensor data from the ATM 206. The ATM 206 may have sensors associated with the ATM 206. In this way, customer and environmental characteristics may be identified. The ATM 206 may compile these characteristics and providing them to the financial institution application 258 as sensor data through the network 201.

In some embodiments, financial institution application 258 may determine an appropriate adjustment to the ATM display. Determining the appropriate adjustment to the ATM display includes determining an appropriate ATM display position based on the customer sensor data that maximized the customer's privacy during the ATM transaction. The determination is done by the financial institution application 258, utilizing all of the retrieved customer sensor data and compiling it together to determine an appropriate position for the ATM display and data presented on the ATM display for maximum privacy for the customer 202. As such, each customer sensor data, both customer related and environmentally related, as well as general information about the ATM 206 location may be taken into consideration by the financial institution application 258 and processed via the processing device 248.

In some embodiments, the financial institution application 258 may determine that the ATM display and information displayed thereon will be presented directly in front of the customer 202 and/or in front of the portion of the customer 202 that is least visible by others around the customer 202. In other embodiments, the financial institution application 258 may determine that other locations of the ATM display and/or the information displayed on the display may be displayed. In this way, the financial institution application 258 may provide a display that is least visible to others around the customer 202. Thus, the financial institution application 258 may determine that the ATM display may need to be in the left, right, center, lower left, lower right, lower center, upper right, upper left and/or upper center of the ATM 206. Furthermore, the financial institution application 258 may determine that the information within the display may be presented in the entire display, a portion of the display, or the like. The financial institution application 258 takes into consideration all received customer sensor data to provide a secure and private position of an ATM display and the information presented thereon within the ATM 206. Furthermore, if one or more locations are determined to be private, the financial institution application 258 may select the position that the financial institution application 258 determines to be the most comfortable viewing area for the customer 202 based on the time of day, customer stature, eye location, and/or the like. As such, the system provides the most private, yet comfortable viewing area for ATM transaction information to be presented to a user on an ATM 206.

In some embodiments, the financial institution application 258 determines the appropriate ATM display location and location of the information presented thereon based on finding the most private location on the ATM 206 for the customer 202. This may be the portion of the ATM 206 most restricted from the public around the customer 202 based on the customer's position, time of day, ATM 206 location, and the like. Furthermore, the financial institution application 258 utilizes the customer sensor data and general information about the location of the ATM 206 to determine the most private location for presentation of the ATM display and the information presented on the ATM display for the customer 202 to complete the ATM transaction.

Once the financial institution application 258 determines the appropriate location for the ATM display and presentation of information on the display, the financial institution application 258 may communicate that location to the ATM 206 via the network 201.

As illustrated in FIG. 2, the ATM 206 is connected to the financial institution server 208 and provides customer 202 interaction. The ATM 206 generally comprises a reading device 235, a communication device 236, a processing device 238, and a memory device 240. The reading device 235 is operatively coupled to the processing device 238, communication device 236, and the memory device 240. The ATM 206 may include a reader device 235 to receive authentication of customer 202 access to his/her accounts at the financial institution. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the consumer's payment account and/or transaction data at the ATM 206 and communicates the information via the communication device 236 over a network 201, to other systems such as, but not limited to the financial institution server 208 and/or the customer system 204. As such, the communication device 236 generally comprises a modem, server, or other device for communicating with other devices on the network 201.

As further illustrated in FIG. 2, the ATM 206 comprises computer-readable instructions 242 stored in the memory device 240, which in one embodiment includes the computer-readable instructions 242 of an ATM application 244.

In the embodiment illustrated in FIG. 2, the ATM application 244 identifies a customer 202 at the ATM 206, senses customer 202 and environment characteristics, provides sensor data to the financial institution server 208, and adjusts the ATM display and/or the ATM information presented on the display.

In some embodiments, the ATM application 244 may identify a customer 202 when he/she initiates or approaches an ATM for an ATM transaction. In some embodiments the ATM application 244 may identify a customer 202 by customer authorization at the reader device 235. In some embodiments, the ATM application 244 may identify the customer 202 based on associate or customer 202 input. In yet other embodiments, the ATM application 244 may identify the customer 202 as being a pre-determined distance away from the ATM 206.

In some embodiments, the ATM application 244 senses customer 202 and environment characteristics using sensors associated with the ATM 206. The sensing of customer 202 and environmental characteristics is preformed via one or more sensors associated with the ATM 206. These one or more sensors collect sensor data from the characteristics identified and are collected and compiled by the ATM application 244. The sensor can identify and track data associated with the customer and/or the environment. The sensors may include motion sensors, distance sensors, temperature sensors, video cameras, eye tracking sensors, or the like. These sensors may be optical, passive infrared (PIR), microwave, ultrasonic, tomographic motion detector, video camera software, heat detector, motion controllers, motion detectors, remote cameras, acoustic sensors, or the like.

In some embodiments, the ATM application 244 collects data from sensors that track customer 202 characteristics. In some embodiments, the ATM application 244 collects data from sensors that track environmental data. Customer data may include the identification of the customer's location relative to the ATM 206. In this way, the system may utilize sensors, such as motion sensors or the like that identify a distance the customer is from a known point on the ATM 206. The ATM application 244 through sensors may identify the horizontal location of the customer 202. In some embodiments, the ATM application 244 through sensors may identify the vertical location of the customer 202 relative to the ATM 206. In some embodiments, the ATM application 244 through sensors may also identify the distance the customer 202 is from the ATM 206. In this way, the sensor may include sensing capabilities such as optical, passive infrared (PIR), microwave, ultrasonic, tomographic motion detector, video camera software, heat detector, motion controllers, motion detectors, remote cameras, acoustic sensors, or the like may be able to identify the customer 202 and his/her location relative to the ATM 206.

In some embodiments the ATM application 244 may sense environmental characteristics using sensors associated with the ATM 206 and/or pre-determined information about the location of the ATM 206 relative to public locations. In this way, the ATM application 244 may gather information associated with the time of day, temperature, location, and the like associated with the environment around the ATM 206.

In some embodiments, the ATM application 244 provides sensor data to the financial institution server 208. The communication is directed from the ATM application 244 through the network 201 to the financial institution server 208.

In some embodiments the ATM application 244 adjusts the ATM display and/or the ATM information presented on the display. In this way, upon receiving the determined location from the financial institution server 208, the ATM application 244 may mechanically move the ATM display location to one or more different locations on the ATM 206. In this way the ATM application 244 may mechanically adjust the ATM display and/or the other devices associated with the ATM 206, as further illustrated in FIG. 6. Mechanical adjustments include vertical/horizontal adjustments of the display, tilt adjustments of the display, vertical/horizontal adjustments of other ATM associated devices, and/or tilt adjustment of other ATM associated devices. Vertical/horizontal adjustment of the display and other devices may be performed by the ATM application 244 utilizing a track movement mechanism, pulley system, or the like that moves the display about the ATM to various locations. Tilt adjustment of the display may be performed by the ATM application 244 and allows for automatic tilting of the display left, right, up, or down in order to provide privacy and comfortable viewing to the customer. The tilt adjustment may be performed using a ball-and-socket or other type of tilt adjustment, such as telescoping or the like.

In some embodiments, the ATM application 244 may provide software adjustment of the ATM information presented on the ATM display of the ATM 206 for the customer's ATM transaction. In this way, the information and data presented to the customer 202 while he/she is performing an ATM transaction may be adjusted within the ATM display to provide additional privacy and comfort for viewing. The ATM application 244 may adjust the location of the presentation of ATM information on the ATM display. In some embodiments, the information may be presented on the entire ATM display. In other embodiments, the information may be presented on one or more smaller portions of the ATM display. The ATM application 244 system may provide a software adjustment to the information on the ATM display by adjusting the brightness level of the information on the display. In some embodiments, the ATM application 244 may turn the ATM display off completely when it is identified that the customer is not looking at the ATM display screen. In other embodiments, the adjustment of brightness level of information on the display may be dimmed or brightened for the privacy of the customer 202.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a process map for sensing of customer positioning 300, in accordance with one embodiment of the present invention. The sensing of customer characteristics is preformed via one or more sensors associated with the ATM. These one or more sensors 302 collect sensor data from the characteristics identified to be compiled to determine ATM display adjustment to maximize privacy of a customer in a public location of an ATM. The sensor can identify and track data associated with the customer and/or the environment. The sensors may include motion sensors, distance sensors, temperature sensors, video cameras, eye tracking sensors, or the like. These sensors may be optical, passive infrared (PIR), microwave, ultrasonic, tomographic motion detector, video camera software, heat detector, motion controllers, motion detectors, remote cameras, acoustic sensors, or the like.

In some embodiments, the sensors 302 track data associated with the customer. In some embodiments, the sensors 302 track data associated with the environment. Customer data may include the identification of the customer's location relative to the ATM 304. In this way, the system may utilize sensors, such as motion sensors or the like that identify a distance the customer is from a known point on the ATM. The sensors 302 may identify the horizontal location of the customer 306. The horizontal location of the customer 306 includes the horizontal location of the customer relative to the center of the ATM. In this way, a customer may be leaning more to the left of the ATM or the right of the ATM. Furthermore, the sensor may determine if the customer covers a portion of the ATM, the entire display of the ATM, or the like. As such, this data may determine the amount of exposure of the ATM to the public depending on the horizontal positioning of the customer in front of or to the side of the ATM. In some embodiments, the sensors 302 may identify the vertical location of the customer 310. As such, the customer may be positioned over the top of the ATM or squatting below the ATM display. In this way, the sensors 302 identify the vertical location 310 of the customer relative to the ATM display screen. In some embodiments, the sensors 302 may also identify the distance the customer is from the ATM 308. As such, the system may identify if the customer is close to the ATM or several feet away from the ATM. Finally, the sensors 302 may identify the customer body position 312 relative to the ATM. In this way, the sensors 302, via optical, passive infrared (PIR), microwave, ultrasonic, tomographic motion detector, video camera software, heat detector, motion controllers, motion detectors, remote cameras, acoustic sensors, or the like may be able to identify the general body position of the customer in front of the ATM. As such, incorporating the horizontal location 306, vertical location 310, distance from the ATM 308, and the customer body position 312 the system may determine an exact position of the customer in relationship to the ATM. As such, the system may be able to utilize this information and other sensor information to determine an appropriate position to position the ATM display and information on the display to maximize customer privacy.

As further illustrated in FIG. 3, the sensors 302 may also identify customer data such as the customer's stature 314. As such, the system may utilize data associated with the customer's stature to determine how much of the display screen the customer may be blocking from the view of public passerbyes. This way, the system may adjust the ATM display to limit the visibility of others from viewing the ATM display and the information being presented thereon.

In some embodiments, the sensors 302 may also perform eye tracking of the customer, as illustrated in block 316. In this way, the sensor may be programmed to identify and monitor the eye location of the customer, such that the system may track where the customer is looking. In this way, the system can trigger a response to the customer based on his/her location of visualization. For example, if the customer is in the middle of an ATM transaction and the sensor 302 identifies that he/she looks away from the ATM display, such as behind him/her, the system may dim or turn off the display so that the customer's private information remains that way. Furthermore, the eye tracking sensor 316 may also provide the system with an indication of a comfortable viewing area for the ATM display for that particular customer. As such, if the comfortable viewing area is in a determined private location, the system will present the ATM transaction data in that area.

Finally, as illustrated in FIG. 3, the sensors 302 may also provide for environmental sensing, as illustrated in block 318. Sensors 302 for environmental sensing 318 include sensors that are capable of sensing the time of day, shadowing, temperature, precipitation conditions, popularity of ATM location, or the like associated with the environment surrounding the ATM.

FIG. 4 illustrates a process map for determining a positioning of ATM data for an ATM transaction 400, in accordance with one embodiment of the present invention. The process 400 is initiated when the system retrieves the customer sensor data captured by the one or more sensors, as illustrated in block 402. This data is retrieved from the sensed characteristics determined by the one or more sensors. Next, as illustrated in block 404, the process 400 continues by compiling the customer sensor data that was retrieved in block 402.

Once compiled, the system may determine an appropriate ATM display position based on the customer sensor data that maximized the customer's privacy during the ATM transaction, as illustrated in block 406. The determination is done by utilizing all of the retrieved customer sensor data and compiling it together to determine an appropriate position for the ATM display and data presented on the ATM display for maximum privacy for the customer. As such, each customer sensor data, both customer related and environmentally related, as well as general information about the ATM location may be taken into consideration. General information about the ATM may include the ATMs location and general popularity of the particular location.

In some embodiments, the ATM display and information displayed thereon will be presented directly in front of the customer and/or in front of the portion of the customer that is least visible by others around the customer. Providing a display that is least visible to others around the customer may indicate that the ATM display may need to be in the left, right, center, lower left, lower right, lower center, upper right, upper left and/or upper center of the ATM. Furthermore, the information within the display may be presented in the entire display, a portion of the display, or the like. The system takes into consideration all received customer sensor data to provide a secure and private position of an ATM display and the information presented thereon. Furthermore, if one or more locations are determined to be private, the system may select the position that the system determines to be the most comfortable viewing area for the customer based on the time of day, customer stature, eye location, and/or the like. As such, the system provides the most private, yet comfortable viewing area for ATM transaction information to be presented to a user on an ATM.

In some embodiments, the determined appropriate ATM display location is based on the determined most private location on the ATM for the display. The private location is determined based on the customer sensor data and general information about the location of the ATM. For example, if an ATM is located on an elevated platform, the system may recognize that lower regions may be more visible to the public. Furthermore, if the ATM is located on a busy street, the system may determine that maximum privacy may be needed. In this way, the display of the ATM and/or the information displayed thereon may be positioned in the area of the ATM that is most private based on where the customer is positioned in front of the ATM and where others may be able to view on the ATM when the customer is in front of the ATM.

Next, as illustrated in block 408, once a determination is made for the appropriate ATM display position and the appropriate position of the information to be presented on the display in block 406, the process 400 continues by adjusting the ATM display mechanically or via software based on the determined appropriate ATM display position for the customer and his/her privacy. Finally, as illustrated in block 410, the ATM information may be presented to the customer via the adjusted ATM display for the customer to complete the ATM transaction.

FIG. 5 illustrates a process map for the mechanical and software adjustment of the ATM display and ATM information presented on the display 500, in accordance with one embodiment of the present invention. In some embodiments, the ATM display may be adjusted using a mechanical adjustment 502. In some embodiments, the location of the information presented on the ATM display may be adjusted using a software adjustment 504.

Mechanical adjustments 502 include vertical/horizontal adjustments of the display 506, tilt adjustments of the display 508, vertical/horizontal adjustments of other ATM associated devices 510, and/or tilt adjustment of other ATM associated devices 512. Vertical/horizontal adjustment of the display 506 may be performed by utilizing a track movement mechanism, pulley system, or the like that moves the display about the ATM to various locations. In some embodiments, the vertical/horizontal adjustment of the display 506 may be performed electronically by the system based on the customer sensor data. The vertical/horizontal adjustment of the display 506 may provide adjustments to the ATM display vertically, horizontally, or on any angle required to provide privacy to the customer. Tilt adjustment of the display 508 allows for automatic tilting of the display left, right, up, or down in order to provide privacy and comfortable viewing to the customer. The tilt adjustment may be performed using a ball-and-socket or other type of tilt adjustment, such as telescoping or the like. Similarly to above the other ATM associated devices may vertically/horizontally adjust 510 and the other ATM associated devices may tilt adjust 512. The other ATM associated devices may include one or more of the debit/credit card input, withdraw slot, deposit slot, key pad, or the like.

In some embodiments, the system may provide software adjustment 504 of the ATM information presented on the ATM display for the customer's ATM transaction. In this way, the information and data presented to the customer while he/she is performing an ATM transaction may be adjusted within the ATM display to provide additional privacy and comfort for viewing. As illustrated in block 514, the system may adjust the location of the presentation of ATM information on the ATM display. In some embodiments, the information may be presented on the entire ATM display. In other embodiments, the information may be presented on one or more smaller portions of the ATM display. As illustrated in block 516, the system may provide a software adjustment 504 to the information on the ATM display by adjusting the brightness level of the information on the display. In some embodiments, the system may turn the ATM display off completely when it is identified that the customer is not looking at the ATM display screen. In other embodiments, the adjustment of brightness level of information on the display 516 may be dimmed or brightened for the privacy of the customer.

FIG. 6 provides a representative illustration of an ATM 600, in accordance with one embodiment of the present invention. In some embodiments, the representative ATM may comprise features similar to features found on a standard ATM. The lighting means 608 may be located above the display 602 that may provide a customer light for use during an ATM transaction. Of note, the display 602 may be vertically adjusted or horizontally adjusted along tracks or the like to position itself across the entire ATM 600. While currently illustrated in the upper left corner of the ATM 600, one will appreciate that the display may move to the right upper corner or below to the lower corners of the ATM 600 and/or anywhere in between if necessary. The lighting means 608 may also be moved with the ATM display 602 and provide the customer a safety mechanism to aid in the ATM transaction.

The cash receptacle 607 may provide the customer means for receiving cash that the customer requests for a withdraw through the ATM transaction. In some embodiments, the ATM 600 may also include a contactless identification sensor 612, a contact identification sensor 614 such as a debit or ATM card acceptor, a keypad 604, a receipt receptacle 610, and a deposit receptacle 616. In some embodiments, the contactless identifier 612 and/or the contact identifier 614 may provide the ATM 600 means of receiving identification from the customer. The customer may provide contactless or contact identification means through the ATM 600. The identification means using the contactless or contact identifications may be provided through several mechanisms, including, but not limited to, biometric identification, laser identification, magnetic strip identification, barcode identification, radio frequency (RF), a character recognition device, a magnetic ink, code readers, wireless communication, debit card scanning, ATM card scanning, and/or the like. The authentication from the contactless identifier of contact identifier may be read by the ATM application. After the authentication has been read, the system may provide the authentication to the financial institution to authorize an ATM transaction.

In some embodiments, the keypad 604 may provide for identification of the customer for use of the ATM 600. The keypad 604 may provide the customer means for inputting a pin number identification. In this way, the keypad 604 enables the customer to input his pin number into the ATM 600. In some embodiments, the pin number inputted on the keypad 604 may be read by the system. After the pin number has been read, the ATM 600 may receive the pin number and provide authentication of the identification with the financial institution system.

The display 602 provides a means for displaying information related to the customer's ATM transaction. Display information may be, but is not limited to display of interfaces, such as the start-up interface and an ATM transaction interface. In some embodiments, the display 602 is a touch screen display module.

FIG. 7 illustrates a process map presenting the software adjustment of the ATM display 602, in accordance with one embodiment of the present invention. As illustrated in FIG. 7, the ATM display 602 is illustrated. In this embodiment, there are 12 different locations or quadrants within the ATM display 602 that the ATM information may be presented to the customer for viewing and completing an ATM transaction. As such, the system may present the ATM information on the display in one or more of the various quadrants such that the customer may be presented with the ATM information in the most private location on the ATM display 602. In the embodiment illustrated in FIG. 7 the ATM display 602 includes several display locations, including a typical Display Location 702, Display Location 1 704, Display Location 2 706, Display Location 3 708, Display Location 4 710, Display Location 5 712, Display Location 6 714, Display Location 7 716, Display Location 8 718, Display Location 9 720, Display Location 10 722, Display Location 11 724.

FIG. 8 illustrates a process map of the mechanical adjustment of ATM display 602 on the ATM 600, in accordance with one embodiment of the present invention. As such, the system may mechanically move the ATM display 602 and/or other components of the ATM 600 to various locations within the ATM 600 for privacy purposes. In the embodiment illustrated in FIG. 8, the ATM 600 includes several ATM display locations, including a typical ATM display location 802. However, alternative locations of the ATM display may be provided. The ATM display may be mechanically moved and relocated to each of the one or more other locations. These locations include ATM Display Location 2 804, ATM Display Location 3 806, ATM Display Location 4 808, ATM Display Location 5 810, and ATM Display Location 6 812.

In various embodiments of the invention, an ATM may be pre-configured based on user preference(s). For example, in some embodiments, an ATM may be pre-configured for a customer's preferred language. The customer may load his or her language preference into a mobile application running on their mobile device. The mobile device application transmits the language preference to the ATM such as by readable indicia like a QR code, by short distance communication protocol such as NFC or other communication. Any type of ATM customization may be initiated using a similar procedure. The mobile device application may also allow the customer to pre-stage a transaction in his or her preferred language for queuing and transmission to the ATM. When the customer arrives at the ATM, the queued transaction is transferred to the ATM using a QR code or using NFC or other communication and the transaction may be completed.

Referring to FIG. 9, a flowchart illustrates a method 900 for configuring an ATM according to embodiments of the invention. The first step, represented by block 902, is to receive at least one customer preference for conducting transactions at an ATM. In some embodiments, the customer preference may include a preferred language, a preferred type of transaction, a request for assistance from the closest available financial institution employee, a specialist contact option, or the like. The next step, represented by block 904, is to receive input from the customer indicating the customer's desire to conduct an ATM transaction. The last step, represented by block 906, is in response to receiving the customer input, to generate a customer preference communication for receipt by the ATM.

Referring to FIG. 10, a flowchart illustrates a method 1000 for configuring an ATM according to embodiments of the invention. The first step, represented by block 1002, is to determine that the mobile device has entered a foreign jurisdiction. In some embodiments, the system may be configured to determine location information associated with the customer's mobile device and determine that the customer's mobile device is located in a foreign jurisdiction. The next step, represented by block 1004, is in response to determining that the mobile device has entered the foreign jurisdiction, prompt the customer regarding whether the customer desires ATM transactions to be conducted in a preferred language of the customer. Typically, ATMs in foreign countries provide a customer with language settings native to the particular foreign country. A customer who is not familiar with the language may not be able to recognize the different options available. In this regard, the system may be configured to prompt the customer regarding whether the customer desires ATM transactions to be conducted in one or more languages predetermined by the customer as preferred languages. In one aspect, the system may transmit a notification to the customer on the customer's mobile device. In one aspect, the customer may select the preferred language directly on the ATM. In another aspect, the customer may select the preferred language on the mobile phone and communicate the selection using readable indicia to the ATM. The last step, represented by block 1006, is to generate the customer preference communication comprising information corresponding to the preferred language of the customer.

Referring to FIG. 11, a flowchart illustrates a method 1100 for pre-staging an ATM transaction according to embodiments of the invention. The first step, represented by block 1102, is to prompt the customer to input whether the customer desires to pre-stage the ATM transaction. In this regard, the system may be configured to enable the customer to initiate one or more aspects of the transaction on the customer's mobile device prior to approaching the ATM. In one aspect, the system may be configured to enable the customer to initiate the transaction using a mobile application running on the customer's mobile application. In one aspect, the prompt may include a text message, an email, a pop up notification, or the like.

The next step, represented by block 1104, is to receive customer input indicating the customer's desire to pre-stage the ATM transaction. In this regard, the customer may transmit a notification to the system indicating the customer's desire to pre-stage the ATM transaction using a text message, an email, a hand gesture, a flashing/illumination of an LED, or the like. The next step, represented by block 1106, is to receive transaction details from the customer. In some embodiments, the transaction details may include an authentication credential associated with the customer. In this regard, the system may be configured to receive a customer input with one or more authentication credentials for validation to verify the customer's identity. In some embodiments, the one or more authentication credentials include a personal identification number (PIN), customer biometrics, a username/password, or the like.

The last step, represented by block 1108, is to generate the customer preference communication including a readable indicia with information corresponding to the received transaction details. In this regard, the system may be configured to enable a customer to store the one or more aspects of the transaction initiated by the customer on the mobile device on readable indicia such as a Quick Response (QR) code, a barcode, or the like. In response to the transaction being stored in readable indicia, the system may be configured to receive the readable indicia from the customer and retrieve one or more aspects of the pre-staged transaction to be completed.

Referring to FIG. 12, a flowchart illustrates a method 1200 for configuring an ATM according to embodiments of the invention. The first step, represented by block 1202, is to receive a one-use PIN from a backend system of a financial institution managing the ATM. In this regard, the system may be configured to store one or more customer preferences including a customer's preferred language of correspondence with one or more devices associated with the financial institution (e.g., ATM). In one aspect, the customer's preferences may be stored in a database associated with the financial institution and mapped to one or more one-use PINs.

The next step, represented by block 1204, is to communicate a one-use PIN to the customer, where the one-use PIN corresponds to a preferred language of the customer. For example, if a customer is attempting to access and ATM in a foreign country, say, France, the back-end system associated with the financial institution may recognize that the customer's preferred language is in English based on predefined customer preferences. In response, the system may communicate the preference to the ATM using a corresponding one-use PIN. In one aspect, the system may be configured to transmit the one-use PIN to the customer's mobile device and stored as readable indicia. In this regard, the one-use PIN indicating the customer's language preference may be received by the ATM using readable indicia associated with the customer's mobile phone. The last step, represented by block 1206, is to conduct the ATM transaction in the preferred language of the customer.

Referring to FIG. 13, a flowchart illustrates a method 1300 for utilizing a dynamic currency exchange according to embodiments of the invention. The first step, represented by block 1302, is to determine that the mobile device has entered a foreign jurisdiction. In some embodiments, the system may be configured to determine location information associated with the customer's mobile device and determine that the customer's mobile device is located in a foreign jurisdiction. In this regard, the system may use one or more predetermined conditions associated with geographical boundaries of political entities or legal jurisdictions to determine a foreign jurisdiction. In one aspect, a foreign jurisdiction may be international such as a national border. In another aspect, a foreign jurisdiction may be domestic such as a state border.

The next step, represented by block 1304, is to generate an alert communicating to the customer location information corresponding to at least one ATM near a location of the mobile device. In this regard, the system may be configured to determine the customer's current location using a location determining device associated with the customer's mobile device. In response to determining the customer's current location, the system may be configured to determine a list of ATMs located in proximity to the location of the customer's mobile device. In response to determining a list of ATMs, the system may then communicate to the user, location information associated with each of the one or more ATMs in proximity to the customer's current location. In one aspect, the location information associated with each of the one or more ATMs may include at least a distance from the customer's current location to the location of the ATM, a most efficient traffic route, travel time, local modes of transportation, or the like. In some embodiments, the alert communicating the location information may include a dynamic currency conversion rate associated with the ATM.

The last step, represented by block 1306, is to generate an alert communicating to the customer availability of a dynamic currency exchange, whereby the customer may access a network among multiple financial institutions contracting with one another to provide efficient currency exchange. In this regard, the system may be configured to determine the current conversion rate associated with the determined foreign jurisdiction and the customer's domestic jurisdiction among multiple financial institutions in the foreign jurisdiction with active contracts with the customer's financial institution. For example, if the customer is a financial institution account holder in the United States and the system has determined that the customer has crossed international border and entered Mexico, the system immediately identifies the value of 1 Mexican Peso=0.062 United States Dollars as the most efficient currency conversion for the customer from currency information collected from the one or more financial institutions in the foreign jurisdiction with active contracts with the customer's financial institution. In response the determining the current conversion rate, the system may be configured to generate an alert communicating the availability of a dynamic currency exchange and present the most efficient currency conversion rate to the customer.

What is claimed is:

1. An automated teller machine (ATM), wherein the ATM is configured to enhance customer privacy and security, comprising:
    a computer apparatus including a processor and a memory; and
    a module stored in the memory, comprising executable instructions that when executed by the processor cause the processor to:
    sense, via one or more sensor devices of the ATM, characteristics associated with the customer, comprising:
        identifying a customer location relative to the ATM, the customer location comprising a vertical location of the customer relative to the ATM, a horizontal location of the customer relative to the ATM, a distance of the customer from the ATM and a customer body position;
        identifying a customer stature, wherein identifying customer stature comprises determining a first portion of an ATM display blocked by the customer from a surrounding view;
        tracking a position of the eyes of the customer, comprising determining a current customer view area; and
        sensing at least one environmental condition proximate the ATM and/or customer;
    determine and implement adjustments to the ATM display based on at least the sensed characteristics, wherein implementing the adjustments to the ATM display further comprises:
        implementing mechanical adjustments to the ATM display, comprising:
            determining an appropriate ATM display position based on at least the sensed characteristics, whereby customer experience and privacy are enhanced; and
            adjusting the ATM display mechanically based on the determined appropriate ATM display position by initiating vertical movement of the ATM display, horizontal movement of the ATM display and/or tilting of the ATM display; and
        implementing software adjustments to the ATM display, comprising:
            determining a second portion of the ATM display least visible from the surrounding view based on the sensed characteristics and a geographic location of the ATM; and
            relocating information displayed on the ATM display into the second portion of the ATM display for customer privacy and comfort of viewing;
    present data to the customer using the adjusted ATM display;
    receive input from the customer indicating the customer's desire to conduct an ATM transaction;
    establish an operative communication channel between a mobile device of the customer and the ATM; and
    receive, from the mobile device of the customer via the operative communication channel, a customer preference communication, wherein the customer preference communication comprises at least one of the at least one customer preferences for conducting transactions at an ATM, comprising receiving the customer preference communication from the mobile device via a short distance communication protocol or via a readable indicia.

2. The ATM of claim 1, wherein receiving the customer preference communication comprises reading the readable indicia comprising information corresponding to the at least one of the at least one customer preferences.

3. The ATM of claim 2, wherein the readable indicia comprises a QR code.

4. The ATM of claim 1, wherein receiving the customer preference communication from the mobile device via a short distance communication protocol comprises receiving an NFC communication via the operative communication channel.

5. The ATM of claim 1, wherein the at least one customer preference comprises a preferred language for conducting ATM transactions.

6. The ATM of claim 1:
    wherein the mobile device determines that the mobile device has entered a jurisdiction foreign to the customer's home jurisdiction;
    wherein, in response to determining that the mobile device has entered the foreign jurisdiction, the mobile device prompts the customer regarding whether the customer desires ATM transactions to be conducted in a preferred language of the customer; and
    wherein the customer preference communication comprises at least one customer preference comprising information corresponding to the preferred language of the customer.

7. The ATM of claim 1, wherein the executable instructions that when executed by the processor further cause the processor to:
    initiate prompting the customer to input whether the customer desires to pre-stage the ATM transaction;
    receive customer input indicating the customer's desire to pre-stage the ATM transaction;
    receive transaction details from the customer; and
    wherein receiving the customer preference communication comprises reading the readable indicia comprising information corresponding to the received transaction details.

8. The ATM of claim 1, wherein the executable instructions that when executed by the processor further cause the processor to:
    communicate a one-use personal identification number (PIN) to the customer, wherein the one-use PIN corresponds to a preferred language of the customer;
    wherein when the customer enters the one-use PIN into the ATM, the ATM transaction is conducted in the preferred language of the customer.

9. The ATM of claim 8, wherein the executable instructions that when executed by the processor further cause the processor to:
    receive the one-use PIN from a backend system of a financial institution managing the ATM.

10. The ATM of claim 1, wherein the executable instructions that when executed by the processor further cause the processor to:
    determine that the mobile device has entered a jurisdiction foreign to the customer's home jurisdiction; and
    generate an alert communicating to the customer availability of a dynamic currency exchange.

11. The ATM of claim 10, wherein the executable instructions that when executed by the processor further cause the processor to:
  generate an alert communicating to the customer location information corresponding to at least one ATM near a location of the mobile device.

12. The ATM of claim 1, wherein the executable instructions that when executed by the processor further cause the processor to:
  determine that the current customer view area is different from the ATM display; and
  in response, turn off the ATM display or reduce a brightness level of the ATM display.

13. A computer program product for enhancing customer privacy and security at an automated teller machine (ATM), comprising a non-transitory computer-readable medium comprising code causing the ATM to:
  sense, via one or more sensor devices of the ATM, characteristics associated with the customer, comprising:
    identifying a customer location relative to the ATM, the customer location comprising a vertical location of the customer relative to the ATM, a horizontal location of the customer relative to the ATM, a distance of the customer from the ATM and a customer body position;
    identifying a customer stature, wherein identifying customer stature comprises determining a first portion of an ATM display blocked by the customer from a surrounding view;
    tracking a position of the eyes of the customer, comprising determining a current customer view area; and
    sensing at least one environmental condition proximate the ATM and/or customer;
  determine and implement adjustments to the ATM display based on at least the sensed characteristics, wherein implementing the adjustments to the ATM display further comprises:
    implementing mechanical adjustments to the ATM display, comprising:
      determining an appropriate ATM display position based on at least the sensed characteristics, whereby customer experience and privacy are enhanced; and
      adjusting the ATM display mechanically based on the determined appropriate ATM display position by initiating vertical movement of the ATM display, horizontal movement of the ATM display and/or tilting of the ATM display; and
    implementing software adjustments to the ATM display, comprising:
      determining a second portion of the ATM display least visible from the surrounding view based on the sensed characteristics and a geographic location of the ATM; and
      relocating information displayed on the ATM display into the second portion of the ATM display for customer privacy and comfort of viewing;
  present data to the customer using the adjusted ATM display;
  receive input from the customer indicating the customer's desire to conduct an ATM transaction;
  establish an operative communication channel between a mobile device of the customer and the ATM; and
  receive, from the mobile device of the customer via the operative communication channel, a customer preference communication wherein the customer preference communication comprises at least one of the at least one customer preferences for conducting transactions at an ATM, comprising receiving the customer preference communication from the mobile device via a short distance communication protocol or via a readable indicia.

14. The computer program product of claim 13, wherein receiving the customer preference communication comprises receiving the readable indicia comprising information corresponding to the at least one of the at least one customer preferences.

15. The computer program product of claim 14, wherein the readable indicia comprises a QR code.

16. The computer program product of claim 13, wherein receiving the customer preference communication from the mobile device via a short distance communication protocol comprises receiving an NFC communication via the operative communication channel.

17. The computer program product of claim 13, wherein the at least one customer preference comprises a preferred language for conducting ATM transactions.

18. The computer program product of claim 13, wherein the code further causes the ATM to:
  determine that the mobile device has entered a jurisdiction foreign to the customer's home jurisdiction;
  in response to determining that the mobile device has entered the foreign jurisdiction, initiate prompting the customer regarding whether the customer desires ATM transactions to be conducted in a preferred language of the customer; and
  wherein the customer preference communication comprises at least one customer preference comprising information corresponding to the preferred language of the customer.

19. The computer program product of claim 13, wherein the code further causes the ATM to:
  determine that the current customer view area is different from the ATM display; and
  in response, turn off the ATM display or reduce a brightness level of the ATM display.

20. An automated teller system (ATM)-implemented method for enhancing customer privacy and security, the method comprising:
  sensing, via one or more sensor devices of the ATM, characteristics associated with the customer, comprising:
    identifying a customer location relative to the ATM, the customer location comprising a vertical location of the customer relative to the ATM, a horizontal location of the customer relative to the ATM, a distance of the customer from the ATM and a customer body position;
    identifying a customer stature, wherein identifying customer stature comprises determining a first portion of an ATM display blocked by the customer from a surrounding view;
    tracking a position of the eyes of the customer, comprising determining a current customer view area; and
    sensing at least one environmental condition proximate the ATM and/or customer;
  determining and implement adjustments to the ATM display based on at least the sensed characteristics, wherein implementing the adjustments to the ATM display further comprises:
    implementing mechanical adjustments to the ATM display, comprising:
      determining an appropriate ATM display position based on at least the sensed characteristics, whereby customer experience and privacy are enhanced; and adjusting the ATM display mechanically based on the determined appropriate ATM display position by initiating vertical movement of the ATM display, horizontal movement of the ATM display and/or tilting of the ATM display; and implementing software adjustments to the ATM display, comprising:

determining a second portion of the ATM display least visible from the surrounding view based on the sensed characteristics and a geographic location of the ATM; and relocating information displayed on the ATM display into the second portion of the ATM display for customer privacy and comfort of viewing;

presenting data to the customer using the adjusted ATM display;

receiving input from the customer indicating the customer's desire to conduct an ATM transaction;

establish an operative communication channel between a mobile device of the customer and the ATM; and receive, from the mobile device of the customer via the operative communication channel, a customer preference communication wherein the customer preference communication comprises at least one of the at least one customer preferences for conducting transactions at an ATM, comprising receiving the customer preference communication from the mobile device via a short distance communication protocol or via a readable indicia.

* * * * *